No. 888,798. PATENTED MAY 26, 1908.
E. T. GREENFIELD.
SPEED INDICATOR.
APPLICATION FILED FEB. 8, 1907.
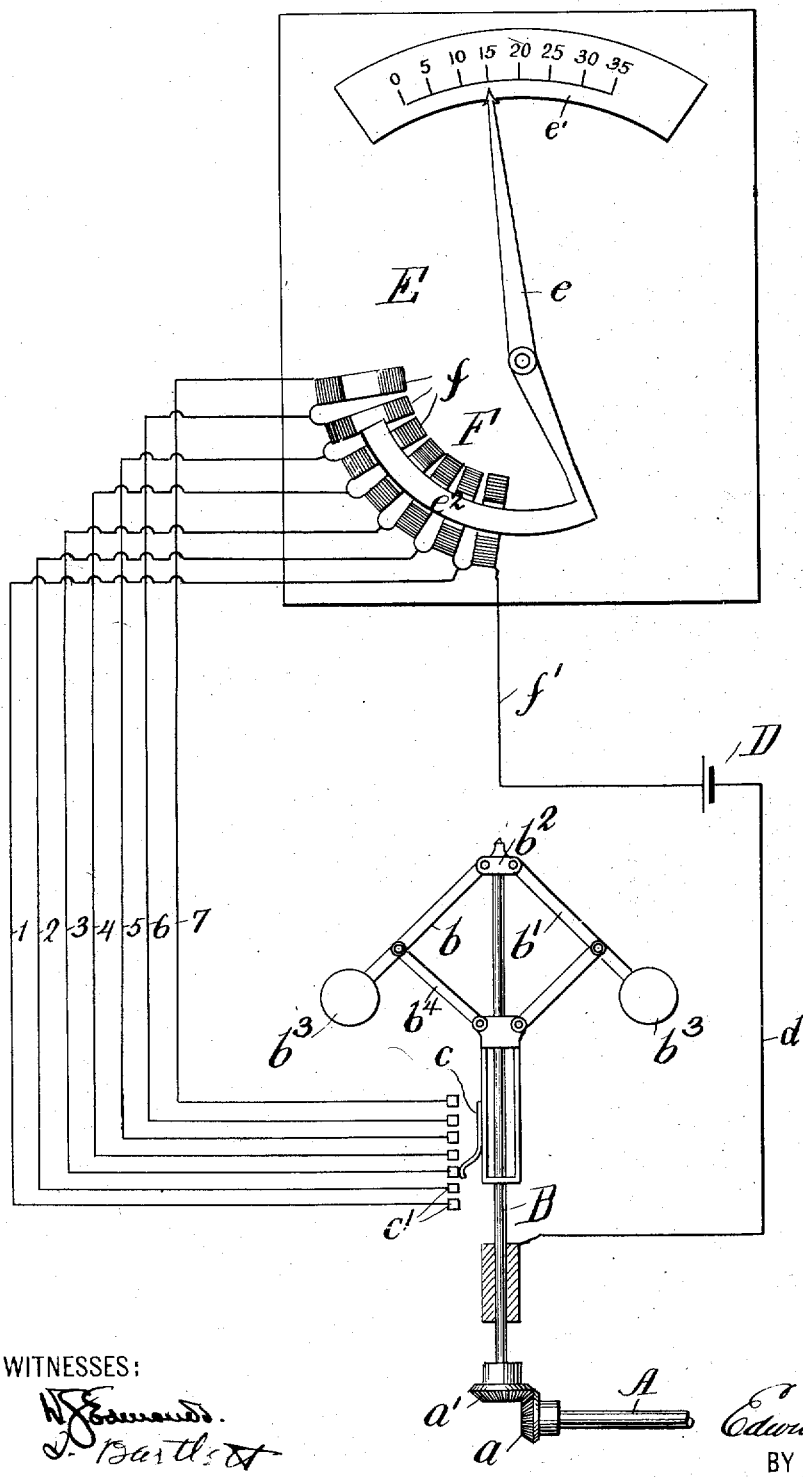

UNITED STATES PATENT OFFICE.

EDWIN T. GREENFIELD, OF KIAMESHA, NEW YORK.

SPEED-INDICATOR.

No. 888,798.  Specification of Letters Patent.  Patented May 26, 1908.

Application filed February 8, 1907. Serial No. 356,382.

*To all whom it may concern:*

Be it known that I, EDWIN T. GREENFIELD, a citizen of the United States, residing at Kiamesha, in the county of Sullivan and State of New York, have invented a certain new and useful Improvement in Speed-Indicators, of which the following is a specification.

This invention relates to devices for indicating the speed of rotation of a rotary shaft and is adapted particularly for use on self-propelled vehicles as an indicator of the speed at which the vehicle is traveling.

The object of the invention is to provide an instrument for this use which can be manufactured at small cost.

The invention consists in the combination of a device connected to a rotating shaft and actuated by centrifugal force to vary electrical connections to a solenoidal coil controlling an indicator which moves over a suitable scale, the latter being calibrated to read in miles per hour at which the vehicle is traveling. The centrifugal device is preferably a ball governor, the movable member of which carries a brush adapted to move over contacts arranged in line. The solenoidal coil is of arc shape and consists of a plurality of coil sections; its core is also arc-shaped and has secured thereto a pivoted indicator, the pivot being the center about which the arc-shaped core and coil are curved. The centrifugal governor is preferably arranged to cut into the circuit of a battery or other source of supply of electric energy one or more of the sections of the coil and the number of such sections having current passing therethrough determines the position of the core and indicator.

The preferred embodiment of the invention is illustrated in the accompanying drawing which is a diagrammatic view of the several parts and the electrical connections between them.

Referring to the drawing, A indicates the shaft whose speed of rotation is to be indicated. This is arranged to drive the shaft B of a centrifugal governor in any suitable manner, as by means of the bevel gears $a$, $a'$. Shaft B has arms $b$, $b'$ pivoted to a collar $b^2$ secured thereon and each of these arms carries a weight $b^3$. Links $b^4$ are each pivoted at one end to one of the arms $b$, $b'$ and at the other to a frame C adapted to slide axially on shaft B. This frame carries a brush $c$ adapted to slide over and make contact with a plurality of contacts $c'$ arranged in line as the frame C moves on shaft B. Brush $c$ is connected to one terminal of a battery D by a wire $d$, as by connecting wire $d$ to a bearing for shaft B.

The indicating instrument consists of a base E on which is pivotally mounted an index $e$, one end of which moves over a scale $e'$ and the other end of which has secured thereto an arc-shaped core $e^2$ curved about the pivot of the index as a center and adapted to enter more or less into a coil F similarly curved. Coil F consists of a plurality of sections $f$, seven such sections being here shown though the number may be varied as desired. One side of the first coil-section is connected by wire $f'$ to the battery D; the other side of this section is connected to the next section as are all the other adjacent coil-sections.

The first of the contacts $c'$, that is, the lowest one, is connected by wire 1 to the connection between the first and second coil-sections $f$, the second by wire 2 to the connection between the second and third coil-sections, the third by wire 3 to the connection between the third and fourth sections and so on, the last one being connected by wire 7 to the end of the last coil-section. The movable element of the indicating instrument including the core $e^2$ and index $e$ may be so constructed as to come to a balance with the index in the zero position.

The operation of the device as thus constructed will now be described.

When shaft A is at rest, shaft B is also at rest and weights $b^3$, frame C and brush $c$ drop by gravity to their lowest positions, brush $c$ being then out of contact with the contact studs $c'$, and the circuit of battery D is open. As shaft A begins to rotate, shaft B rotates with it and the weights $b^3$ move up carrying frame C with them in proportion to the speed of shafts A and B until brush $c$ engages the first contact $c'$. The circuit of battery D is then closed through the first of the coil-sections $f$, and the latter, becoming energized, acts on core $e^2$ to move it to a position in which it is centrally disposed with respect to the first coil-section $f$. The indicator is thus moved over the scale $e'$ to a position corresponding to the speed of shaft A when brush $c$ is on the first contact $c'$. If the speed of shaft A is increased, the frame C and brush $c$ are moved up until the brush bears on the next contact $c'$ and the circuit of the battery is then closed through the first and second coil-sections $f$ in series. The combined magnetic flux of the two sections then acts upon core $e^2$ so that the latter is drawn further into the coil F, the core coming to rest when it is centrally disposed with respect to the field of force of these two coil-sections acting together. Similarly as brush $c$ is raised, more of the coil-sections are cut into circuit in series and the center of the magnetic field is shifted as each additional section is cut in, effecting a corresponding change in the position of the core and index. In each new position of the core, the index points to a marking on the scale to indicate the speed of rotation of shaft A or the rate at which the vehicle is traveling.

This form of indicator is well adapted for use on automobiles to show the speed of the vehicle in miles per hour. It can be manufactured at small cost particularly as no flexible shafting is required running from an axle of the vehicle to the dash-board and as a single coil of dry battery furnishes ample current to actuate the indicator. By increasing the number of coil-sections $f$ and contacts $c'$ the increments of speed indicated by the instrument may be reduced but in most cases I have found it sufficient if the number of sections and contacts be such that increments of five miles per hour are shown by the instrument.

Having described my invention what I claim as new therein and desire to secure by Letters Patent of the United States, is:

1. A speed indicator comprising the combination of a rotary shaft, a centrifugal governor driven thereby, a coil consisting of a plurality of coil sections, a source of supply of electric energy, a circuit-controlling device, wires leading therefrom to said coil sections, said device being actuated by said governor to connect varying numbers of said coil sections in circuit with said source of supply, a core for said coil, an indicator connected to said core and actuated thereby, and a scale with which said indicator coöperates, substantially as set forth.

2. A speed indicator comprising the combination of a rotary shaft, a centrifugal governor driven thereby, a coil consisting of a plurality of coil sections, a source of supply of electric energy, a circuit-controlling device, wires leading therefrom to said coil sections, said device being actuated by said governor to connect one or more of said coil sections in series in circuit with said source of supply, a core for said coil, an indicator connected to said core and actuated thereby, and a scale with which said indicator coöperates, substantially as set forth.

3. A speed indicator comprising the combination of a rotary shaft, a centrifugal governor driven thereby, an arc-shaped coil consisting of a plurality of coil sections, a source of supply of electric energy, a circuit-controlling device, wires leading therefrom to said coil sections, said device being actuated by said governor to connect varying numbers of said coil sections in circuit with said source of supply, an arc-shaped core for said coil, a pivoted indicator connected to said core and actuated thereby, and a scale with which said indicator coöperates, substantially as set forth.

4. A speed indicator comprising the combination of a rotary shaft, a centrifugal governor driven thereby, a coil consisting of a plurality of coil sections, a source of supply of electric energy, a circuit-controlling device, wires leading therefrom to said coil sections, said device being actuated by said governor to connect the end section of said coil in circuit with said source of supply or to connect one or more sections adjacent thereto in series with said end section in said circuit, a core for said coil, an indicator connected with said core, and a scale over which said indicator moves, substantially as set forth.

5. A speed indicator comprising the combination of a rotary shaft, a centrifugal governor driven thereby, a coil consisting of a plurality of coil sections, a source of supply of electric energy, a circuit-controlling device, wires leading therefrom to said coil sections, said device being actuated by said governor to connect a progressively increasing number of said coil sections adjacent to one end of the coil in series in circuit with said source of supply as the speed of said centrifugal governor increases, a core for said coil, an indicator actuated by said core, and a scale over which the indicator moves, substantially as set forth.

6. A speed indicator comprising the combination of a rotary shaft, a centrifugal governor driven thereby, an arc-shaped coil consisting of a plurality of coil sections, a source of supply of electric energy, a circuit-controlling device, wires leading therefrom to said coil sections, said device being actuated by said governor to connect a progressively increasing number of said coil sections adjacent to one end of the coil in series in circuit with said source of supply as the speed of said governor increases, an arc-shaped core for said coil, a pivoted indicator actuated by said core, and a scale over which said indicator moves, substantially as set forth.

This specification signed and witnessed this 4th day of February, 1907.

EDWIN T. GREENFIELD.

Witnesses:
E. A. PERRY,
RUBY LASSETER.